United States Patent
Morys et al.

(10) Patent No.: US 9,201,159 B2
(45) Date of Patent: Dec. 1, 2015

(54) NUCLEAR MAGNETIC RESONANCE LOGGING TOOL HAVING AN ARRAY OF ANTENNAS

(75) Inventors: Marian L. Morys, Downingtown, PA (US); Knizhnik Sergei, Exton, PA (US); Rebecca C. Jachmann, Downingtown, PA (US); Robert Epstein, Downingtown, PA (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 344 days.

(21) Appl. No.: 13/519,647

(22) PCT Filed: Jun. 16, 2010

(86) PCT No.: PCT/US2010/038844
§ 371 (c)(1),
(2), (4) Date: Jun. 28, 2012

(87) PCT Pub. No.: WO2011/159294
PCT Pub. Date: Dec. 22, 2011

(65) Prior Publication Data
US 2013/0093422 A1 Apr. 18, 2013

(51) Int. Cl.
*G01V 3/00* (2006.01)
*G01V 3/32* (2006.01)
(Continued)

(52) U.S. Cl.
CPC .. *G01V 3/32* (2013.01); *H01Q 1/04* (2013.01); *H01Q 7/00* (2013.01); *H01Q 21/24* (2013.01)

(58) Field of Classification Search
CPC ........................................................ G01V 3/32
USPC ............................ 324/303, 31, 318, 314, 322
See application file for complete search history.

(56) References Cited

U.S. PATENT DOCUMENTS

| 4,682,112 A | 7/1987 | Beer |
| 4,825,162 A | 4/1989 | Roemer et al. |

(Continued)

FOREIGN PATENT DOCUMENTS

| GB | 2464808 | 5/2010 |
| WO | WO-2008/073112 A1 | 6/2008 |
| WO | WO 2011/159294 | 12/2011 |

OTHER PUBLICATIONS

Morys, Marian L., et al., "Oil Based Mud Imaging Tool with Common Mode Voltage Compensation", PCT Appl No. PCT/US06/34738, filed Sep. 7, 2006, 17 pgs.

(Continued)

*Primary Examiner* — Louis Arana
(74) *Attorney, Agent, or Firm* — Krueger Iselin LLP; Benjamin Fite (57) ABSTRACT

Various disclosed nuclear magnetic resonance (NMR) logging systems and methods employ an array of antennas to provide increased resolution without sacrificing signal-to-noise ratio. Certain method embodiments include: establishing a static magnetic field (B0) with a tool moving along a borehole through a formation; concurrently driving a multiple antenna cells to produce a radio frequency field (B1) in said formation; measuring an individual response from each antenna cell as nuclear spins undergo precession in the formation; and determining at least one characteristic relaxation time of the formation based at least in part on the individual response. The individual responses can be associated with positions where the individual responses were measured, and the relaxation time can be determined from a combination of those responses associated with a given position. Certain responses may be excluded due to tool motion that degrades the measured response.

27 Claims, 8 Drawing Sheets

(51) Int. Cl.
  *H01Q 1/04* (2006.01)
  *H01Q 7/00* (2006.01)
  *H01Q 21/24* (2006.01)

(56) References Cited

U.S. PATENT DOCUMENTS

| | | |
|---|---|---|
| 5,486,762 A | 1/1996 | Freedman et al. |
| 6,184,681 B1 | 2/2001 | Heidler et al. |
| 6,268,726 B1 | 7/2001 | Prammer et al. |
| 6,362,619 B2 | 3/2002 | Prammer et al. |
| 6,522,137 B1 | 2/2003 | Sun et al. |
| 6,577,284 B1 | 6/2003 | Conti |
| 6,583,621 B2 | 6/2003 | Prammer et al. |
| 6,720,765 B2 | 4/2004 | Edwards et al. |
| 6,781,371 B2 | 8/2004 | Taherian et al. |
| 6,825,659 B2 | 11/2004 | Prammer et al. |
| 7,012,426 B2 | 3/2006 | Edwards et al. |
| 7,463,027 B2 | 12/2008 | Prammer et al. |
| 8,378,908 B2 | 2/2013 | Wisler et al. |
| 8,421,454 B2 * | 4/2013 | Prammer et al. ............. 324/303 |
| 2001/0045829 A1 | 11/2001 | Prammer et al. |
| 2004/0119471 A1 | 6/2004 | Blanz et al. |
| 2008/0224707 A1 | 9/2008 | Wisler et al. |
| 2010/0182004 A1 | 7/2010 | Prammer |
| 2013/0063142 A1 * | 3/2013 | Hopper et al. ............. 324/303 |

OTHER PUBLICATIONS

PCT International Search Report and Written Opinion, dated Aug. 24, 2010, Appl No. PCT/US10/38844 , "Nuclear Magnetic Resonance Logging Tool Having an Array of Antennas ", filed Jun. 16, 2010, 9 pgs.

SG Written Opinion, dated Nov. 18, 2014, Appl No. 201204663-7, "Nuclear Magnetic Resonance Logging Tool Having an Array of Antennas ," filed Jun. 16, 2010, 9 pgs.

PCT International Preliminary Report on Patentablility, dated Jan. 3, 2013, Appl No. PCT/US10/38844, "Nuclear Magnetic Resonance Logging Tool Having an Array of Antennas", filed Jun. 16, 2010, 8 pgs.

* cited by examiner

NUCLEAR MAGNETIC RESONANCE LOGGING TOOL HAVING AN ARRAY OF ANTENNAS

BACKGROUND

Modern oil field operators demand access to a great quantity of information regarding the parameters and conditions encountered downhole. Such information typically includes characteristics of the earth formations traversed by the borehole and data relating to the size and configuration of the borehole itself. The collection of information relating to conditions downhole, which commonly is referred to as "logging," can be performed by several methods including wireline logging, tubing-conveyed logging, and "logging while drilling" (LWD).

In wireline logging, a sonde is lowered into the borehole after some or all of the well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

Tubing-conveyed logging is similar to wireline logging, but the sonde is mounted on the end of a tubing string. The rigid nature of the tubing string enables the tubing-conveyed sonde to travel where it would be difficult to send a wireline sonde, e.g., along horizontal or upwardly-inclined sections of the borehole. The tubing string can include embedded conductors in the tubing wall for transporting power and telemetry, or a wireline cable can be fed through the interior of the tubing string, or the sonde can simply store data in memory for later retrieval when the sonde returns to the surface.

In LWD, the drilling assembly includes sensing instruments that measure various parameters as the formation is being drilled, thereby enabling measurements of the formation while it is less affected by fluid invasion. While LWD measurements are desirable, drilling operations create an environment that is generally hostile to electronic instrumentation, telemetry, and sensor operations.

One of the instruments that has been employed in each of these environments is a nuclear magnetic resonance (NMR) logging tool. NMR tools operate by using an imposed static magnetic field, $B_0$, to give nuclei with non-zero nuclear spin (non-zero angular momentum) split energy levels. Since lower energy levels are preferred, an ensemble of nuclei will exhibit an anisotropic distribution of energy states, giving the nuclear spins a preferential polarization parallel to the imposed field. This state creates a net magnetic moment, producing a bulk magnetization. The nuclei (primarily hydrogen nuclei) converge upon their equilibrium alignment with a characteristic exponential relaxation time constant. When this convergence occurs after the nuclei have been placed in a cooperative initial state (discussed below), it is known as recovery. The time constant for recovery is called the "spin-lattice" or "longitudinal" relaxation time $T_1$.

During or after the polarization period, the tool applies a perturbing field, usually in the form of a radio frequency electromagnetic pulse whose magnetic component, $B_1$, is perpendicular to the static field $B_0$. This perturbing field moves the orientation of the magnetization into the transverse (perpendicular) plane. The frequency of the pulse can be chosen to target specific nuclei (e.g., hydrogen). The polarized nuclei are perturbed simultaneously and, when the perturbation ends, they precess around the static magnetic field gradually re-polarizing to align with the static field once again while losing coherence in the transverse plane ($T_2$ relaxation). The precessing nuclei generate a detectable radio frequency signal that can be used to measure statistical distributions of $T_1$, $T_2$, porosities, and/or diffusion constants.

The transverse relaxation time (also called the "spin-spin" relaxation time) represents how quickly the transverse plane magnetization disperses through de-phasing and magnitude loss. Forces aligned with the transverse plane contribute to non-adiabatic, non-reversible, relaxation while those aligned with the static field contribute to adiabatic, reversible relaxation. The intrinsic transverse time relaxation constant, i.e., relaxation that is solely attributable to non-adiabatic effects, is labeled as "$T_2$" and it is solely a property of the substance. The measured transverse relaxation time constant, however, is also influenced by environmental factors and field inhomogeneities that cause the magnetization to dephase. The time constant for all transverse relaxation processes together (intrinsic and environmental) is labeled as "$T_2^*$".

To isolate the intrinsic $T_2$ subsequent RF pulses can be applied to invert the spin phases and cause the net magnetization to gradually refocus into phase, thus rebuilding the induced signal to create "spin echoes". After each echo signal peaks (at the time when the nuclei are back in phase), the signal begins to decay again in the same manner as before. Another follow-up pulse can be used to again reverse the instantaneous phases and thereby rebuild the signal again to a subsequent echo.

By using a series of follow-up pulses, the signal is periodically rebuilt after each dephasing, although each rebuilding is to a slightly lesser peak amplitude due to the intrinsic losses in magnetization so eventually the echo signals die out completely. The time constant associated with the decay of the recurring spin echo amplitudes approaches the transverse relaxation time $T_2$. (Molecular motion through gradients cause another irreversible spreading of the magnetization so the true $T_2$ can only be measured in a perfectly uniform magnetic field.)

A sequence of refocusing pulses is known in the art as the Carr-Purcell-Meiboom-Gill (CPMG) pulse sequence. It is most frequently used for measuring $T_2$ distributions. A popular method for measuring $T_1$ distribution employs observing the effect of different recovery time spacings between separate CPMG experiments. Other methods utilizing consecutively spaced RF perturbations followed by a CPMG sequence can also be employed to probe the magnetization build up. As is well known in the industry, the relaxation time distribution information from either $T_2$ or $T_1$ can be readily converted into measurements of porosity (i.e., the relative amount of void space in the formation), hydrocarbon saturation (i.e., the relative percentage of hydrocarbons and water in the formation fluid), and permeability (i.e., the ability of formation fluid to flow from the formation into the well bore). For a more comprehensive overview of the NMR technology including logging methods and various tool designs, the interested reader is directed, for example, to the book by Coates et al. entitled "NMR Logging: Principles and Applications" distributed by Gulf Publishing Company (2000), and hereby incorporated herein by reference for background. Additional description of NMR logging techniques is provided, for example, in U.S. Pat. Nos. 4,710,713; 4,717,876; 4,717,877; 4,717,878; 4,939,648; 5,055,787; 5,055,78; 5,212,447; 5,280,243; 5,309,098; 5,412,320; 5,517,115; 5,557,200; 5,696,448; 5,936,405; 6,005,389; 6,023,164; 6,051,973; 6,107,796; 6,111,408; 6,242,913; 6,255,819; 6,268,726; 6,362,619; 6,512,371; 6,525,534; 6,531,868; 6,541,969;

6,577,125; 6,583,62; 6,646,437; 6,717,404; and 7,463,027 which are hereby incorporated herein by reference.

The signals obtained by nuclear magnetic resonance (NMR) logging tools are weak, e.g., on the order of nanovolts. Signal-to-noise ratio (SNR) is a primary concern when judging the performance of such tools. SNR can be increased by combining multiple measurements and/or by increasing the measurement volume. The measurement volume is a function of magnetic field homogeneity and the height of the transmit and receive antennas. However, the vertical resolution of the tool is also a function of the height of the receive antenna and (due to the tool's motion) the number of measurements that are combined. Existing logging tools have to find a feasible tradeoff between vertical resolution and SNR and hence are not able, under normal operating conditions, to provide a high vertical resolution together with a high SNR.

DESCRIPTION OF THE DRAWINGS

A better understanding of the various disclosed embodiments can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the disclosure to the particular illustrated embodiments, but on the contrary, the intention is to cover all modifications, equivalents and alternatives falling within the scope of the appended claims.

DETAILED DESCRIPTION

Accordingly, there are disclosed herein various nuclear magnetic resonance (NMR) logging systems and methods that employ an array of antennas to provide increased resolution without sacrificing signal-to-noise ratio. Certain method embodiments include: establishing a static magnetic field (B0) with a tool moving along a borehole through a formation; concurrently driving multiple antenna cells to produce a radio frequency field (B1) in said formation; measuring an individual response from each antenna cell as nuclear magnetization undergoes free induction decay in the formation; and determining at least one characteristic relaxation time of the formation based at least in part on the individual response. The individual responses can be associated with positions where the individual responses were measured, and the relaxation time can be determined from a combination of those responses associated with a given position. In some cases, certain responses can be excluded due to tool motion that takes the antenna cell too far away from a properly-initialized region of investigation.

Certain disclosed tool embodiments include an arrangement of magnets that generate a static magnetic field (B0) in a formation and an array of antenna cells attached to the tool body, each cell having at least one coil antenna. Circuitry in the tool drives the cell array in concert to produce a radio frequency field (B1) in the formation, and measures individual responses from the antenna cells as the nuclear spins undergo precession. Generally speaking, each coil antenna can serve both transmit and receive roles, though this is not a requirement. A motion sensing unit in the tool tracks the position and orientation of the antenna cells, enabling the tool to associate each of the measured responses with the location where they were taken, and to stack responses associated with a given location. The tool can take the form of a wireline tool, a logging while drilling tool, or a tubing-conveyed logging tool.

Figures 1, 2:
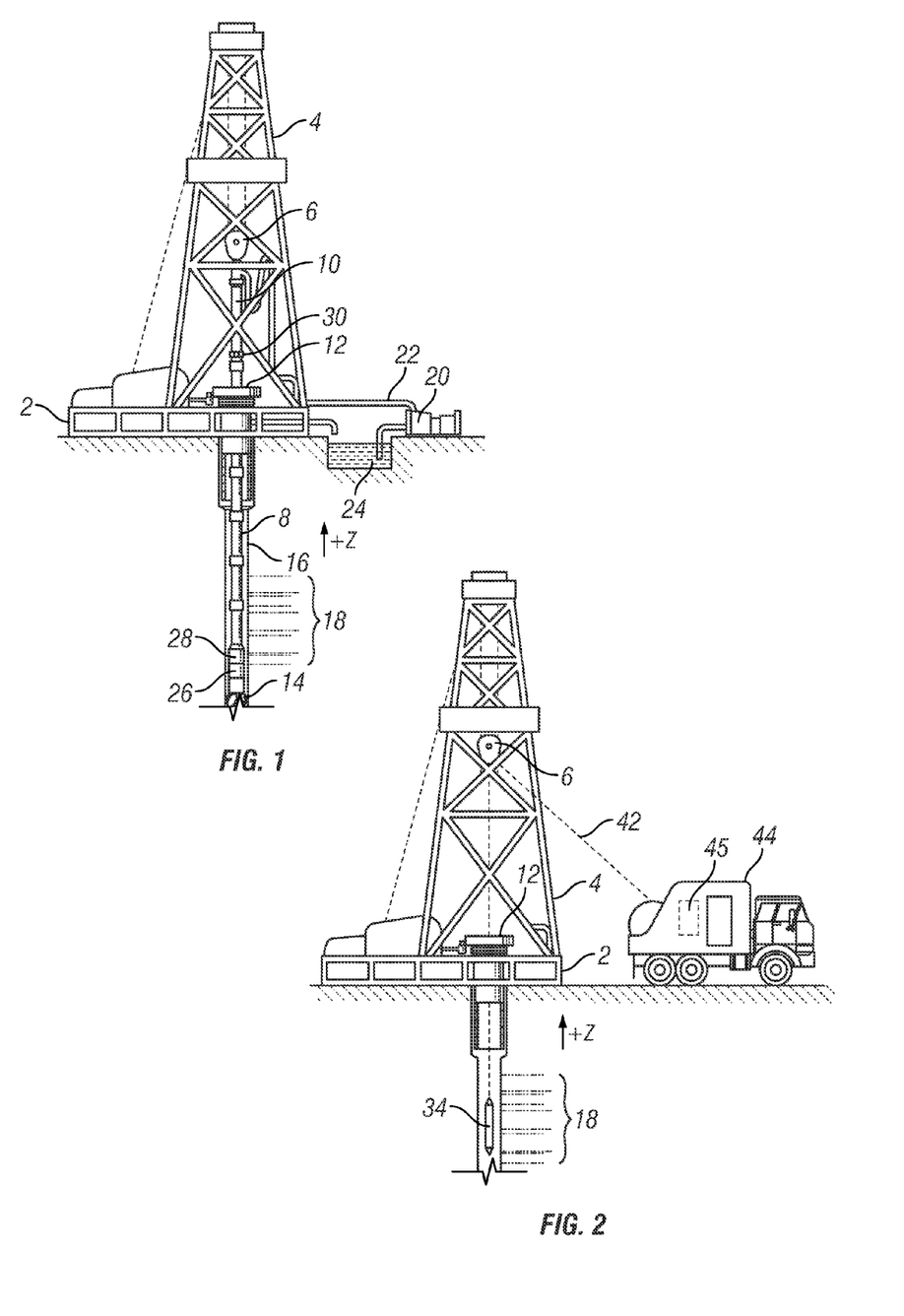
FIG. 1 shows an illustrative environment for logging while drilling ("LWD")
FIG. 2 shows an illustrative environment for wireline logging.

The disclosed systems and methods are best understood in the context of the larger systems in which they operate. FIG. 1 shows an illustrative logging while drilling (LWD) environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An NMR LWD tool 26 is integrated into the bottom-hole assembly near the bit 14. As the bit extends the borehole through the formations, the bottom-hole assembly collects NMR measurements relating to spin relaxation time ($T_1$, $T_2$, and/or $T_2^*$) distributions, as well as various other formation properties and information regarding tool orientation and various other drilling conditions. The NMR logging tool 26 may take the form of a drill collar, i.e., a thick-walled tubular that provides weight and rigidity to aid the drilling process. A telemetry sub 28 may be included to transfer measurement data to a surface receiver 30 and to receive commands from the surface. In some embodiments, the telemetry sub 28 does not communicate with the surface, but rather stores logging data for later retrieval at the surface when the logging assembly is recovered.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. The wireline logging tool 34 may have pads and/or centralizing springs to maintain the tool near the axis of the borehole as the tool is pulled uphole. As explained further below, tool 34 can include an NMR logging instrument that collect relaxation time distribution measurements. A logging facility 44 collects measurements from the logging tool 34, and includes a computer system 45 for processing and storing the measurements gathered by the logging tool.

Figure 3:
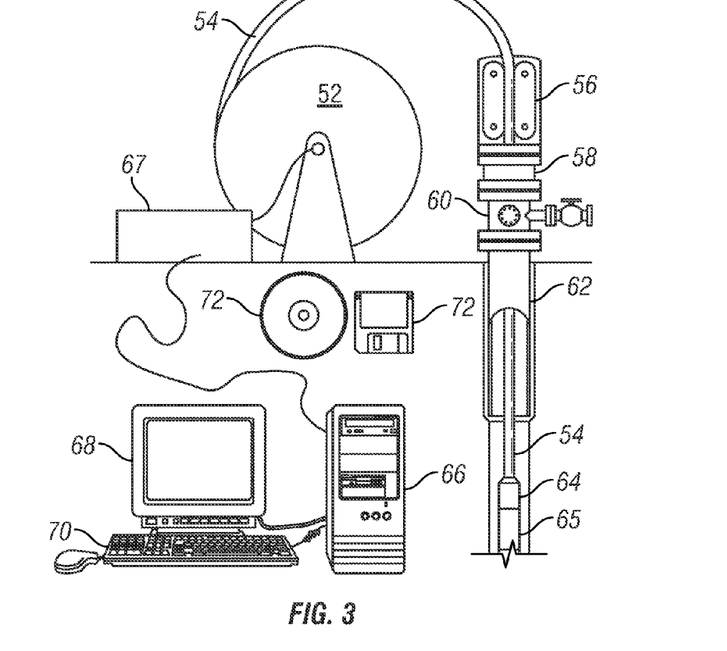
FIG. 3 shows an illustrative environment for tubing-conveyed logging.

An alternative logging technique is tubing-conveyed logging. FIG. 3 shows an illustrative coil tubing logging system in which coil tubing 54 is pulled from a spool 52 by a tubing injector 56 and injected into a well through a packer 58 and a blowout preventer 60 into the well 62. In the well, a supervisory sub 64 and one or more logging tools 65 are coupled to the coil tubing 54 and configured to communicate to a surface computer system 66 via information conduits or other telemetry channels. An uphole interface 67 may be provided to exchange communications with the supervisory sub and receive data to be conveyed to the surface computer system 66.

Surface computer system 66 is configured to communicate with supervisory sub 64 to set logging parameters and collect logging information from the one or more logging tools 65 such as an NMR logging tool. Surface computer system 66 is preferably configured by software (shown in FIG. 3 in the form of removable storage media 72) to monitor and control downhole instruments 64, 65. System 66 includes a display device 68 and a user-input device 70 to enable a human operator to interact with the system control software 72.

In each of the foregoing logging environments, the logging tool assemblies preferably include a navigational sensor package that includes direction sensors for determining the inclination angle, the horizontal angle, and the rotational angle (a.k.a. "tool face angle") of the bottom hole assembly. As is commonly defined in the art, the inclination angle is the deviation from vertically downward, the horizontal angle is the angle in a horizontal plane from true North, and the tool face angle is the orientation (rotational about the tool axis) angle from the high side of the wellbore. In accordance with known techniques, wellbore directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the bottom hole assembly can be determined. Additionally, a three axis magnetometer measures the earth's magnetic field vector in a similar manner. From the combined magnetometer and accelerometer data, the horizontal angle of the bottom hole assembly may be determined. A motion sensing unit can also be included to track the position of the tool. In many cases, the motion sensing unit can derive the position information from the direction sensors.

Figure 4:
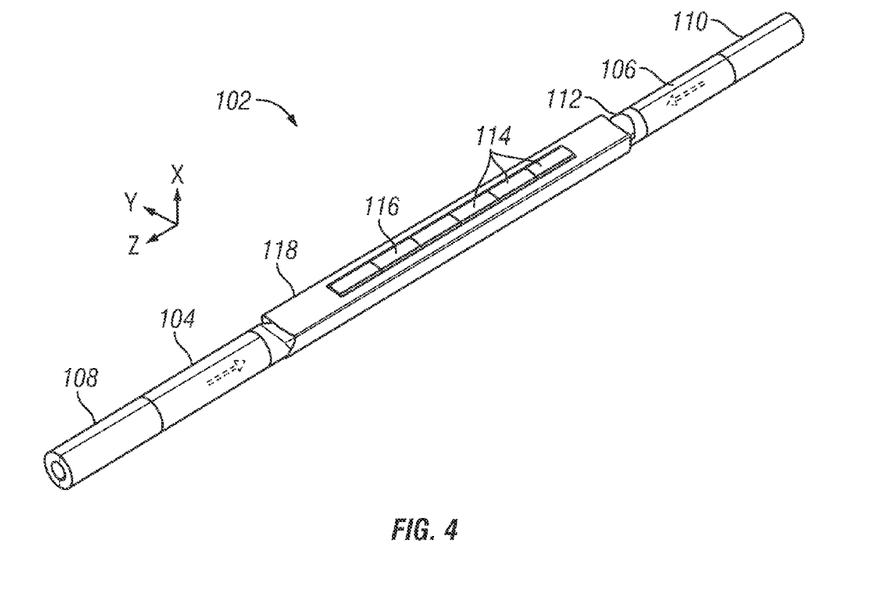
FIG. 4 shows an illustrative NMR logging tool.

FIG. 4 is a perspective view of an illustrative NMR logging tool 102. The static field $B_0$ is generated by two axially-polarized permanent magnets 104, 106 having like magnetic poles oriented towards each other. The magnetic field lines are lengthened by iron poles 108, 110 on the outside ends of the magnets. Between the magnets 104, 106 is an iron yoke 112 that, in addition to shaping the static field, serves as mechanical frame for connecting all of the other tool components. As shown, the yoke 112 is provided with a recess to accommodate the antenna cells 114 without unduly enlarging the transverse dimensions of the tool. The illustrated tool includes six antenna cells 114, each cell having at least one coil antenna 116 with a magnetic moment along the X-axis. (The Z-axis corresponds to the longitudinal axis of the tool.) In some embodiments, each antenna cell has an axial dimension between 3 to 6 inches. The illustrated tool further includes a radio frequency (RF) screen 118 of conductive material to focus the RF field (B1) inside the formation.

Figure 5:
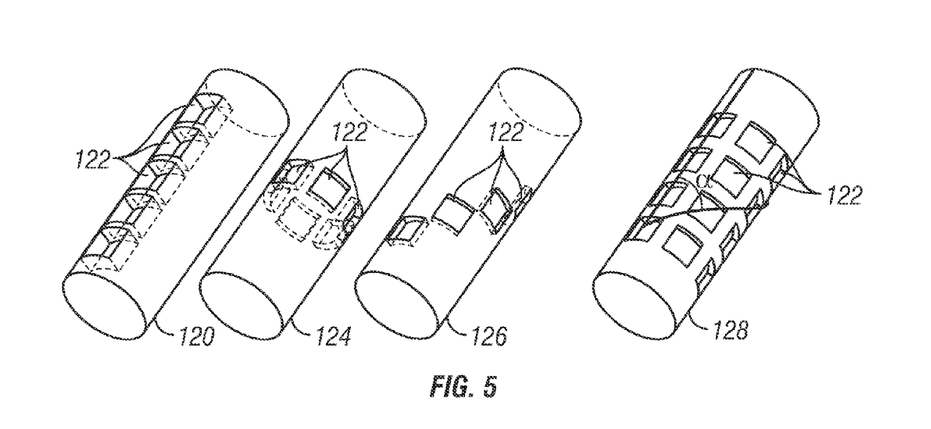
FIG. 5 shows illustrative antenna cell arrangements.

Though logging tool 102 has an axial array of antenna cells, it should be noted that other antenna cell arrangements are contemplated. For example, FIG. 5 shows multiple possible antenna cell arrangements. One tool 120 is shown with an axial arrangement of antenna cells 122. A second tool 124 is shown with a circumferential arrangement. A third tool 126 is shown with a diagonal (or helical) arrangement, and a fourth tool 128 is shown with a grid arrangement. If desired, different portions of the grid arrangement can be used to replicate any of the foregoing arrangements, though the helical angle $\alpha$ is set by the axial and circumferential spacings of the antenna cell grid.

Figure 6:
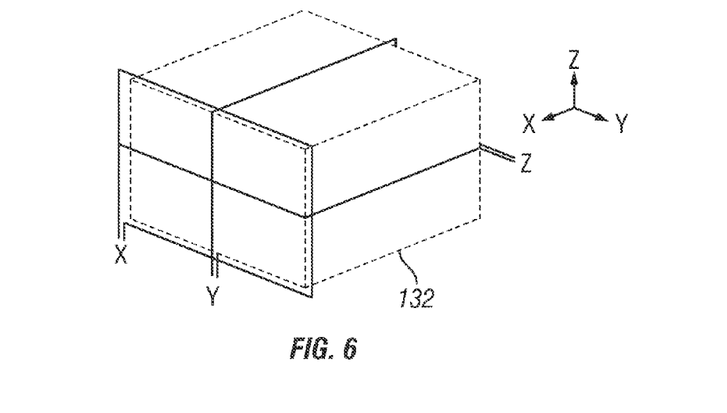
FIG. 6 shows a first illustrative antenna cell.
Figure 7:
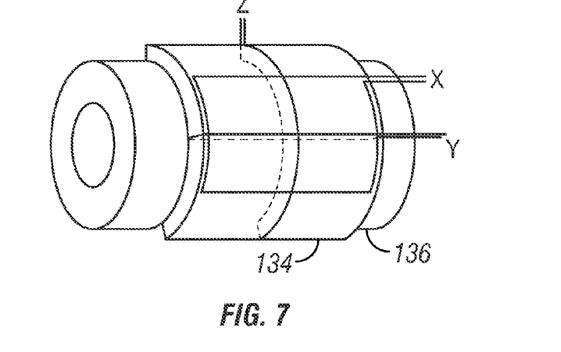
FIG. 7 shows a second illustrative antenna cell.

As suggested in FIG. 6, each antenna cell includes an antenna core 132 preferably comprising some material having a magnetic permeability greater than 10 and minimal ringing from magnetostriction or magnetoacoustic effects, e.g., a powdered iron alloy in an organic binder. The core can support coil antennas with magnetic moments in each of three orthogonal directions, X, Y and Z, though in some tool embodiments each cell would have only one or two such antennas. FIG. 6 shows each coil antenna as a single loop, but it in at least some alternative embodiments each coil antenna has multiple turns. Although the core 132 is shown as a cubical mass, other shapes are contemplated. For example, each core can have an outer surface that lies flush with a curved tool surface. In the embodiment shown in FIG. 7, the core 134 takes the form of a cylindrical shell segment with an inner surface that conforms to the surface of an internal flow pipe 136. Three coil antennas are provided with magnetic moments in the X, Y, and Z directions.

Figure 8:
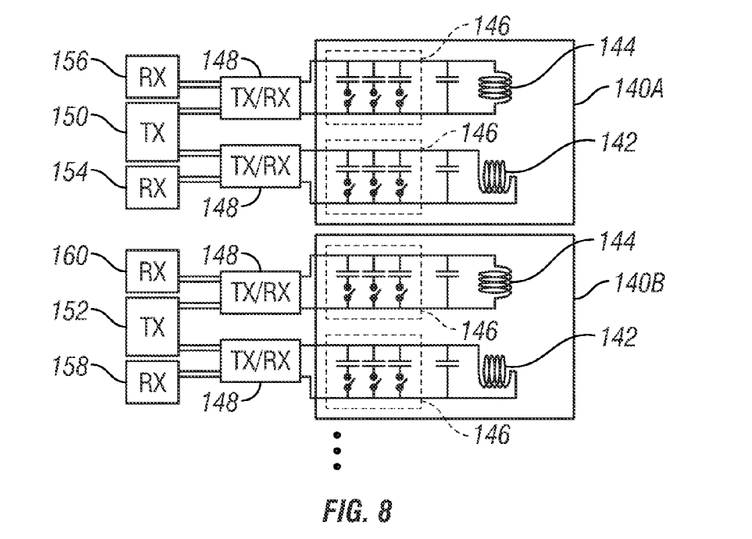
FIG. 8 is a diagram of illustrative transmit/receive circuitry.

FIG. 8 shows an array of antenna cells 140A, 140B, . . . , each antenna cell having two coil antennas 142, 144, which could be oriented along the X and Y axes, for example. The antenna efficiency can be improved through the use of resonant tuning, i.e., through the use of capacitors to balance the coil inductance at the desired operating frequency. For multi-frequency operation each antenna coil can be provided with a set of switchable tuning capacitors 146 to adjust the resonance frequency between measurements. Each of the antenna coils that operates as both a transmitter and receiver includes a transmit/receive switch 148 for switching between modes. Such switches enable the use of sensitive receivers without exposing them to the large currents employed by the transmitter.

Figure 9:
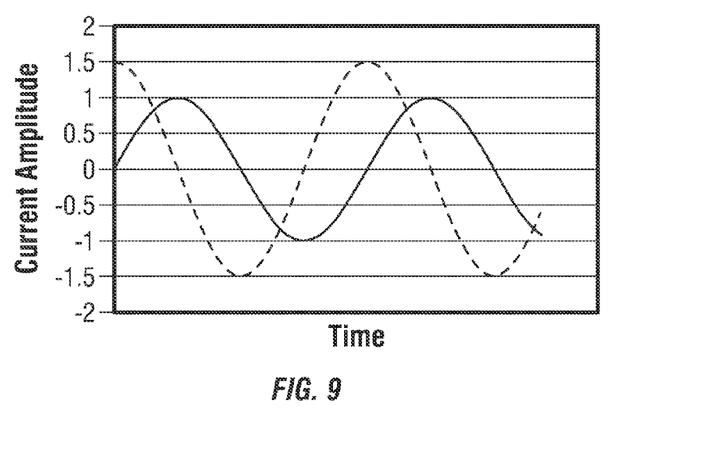
FIG. 9 shows illustrative transmit currents for an antenna cell.

In one embodiment of FIG. 8, each antenna cell is coupled to a corresponding quadrature transmitter 150, 152, etc. to perform circular B1 polarization. Each quadrature transmitter generates two transmit signals with a 90° phase offset as shown in FIG. 9. The two signals are supplied to a pair of coils 144 and 142 (and to all cells simultaneously) to create circularly polarized B1 field inside formation. In the transmit mode, transmitters 150, 152, etc. fire in unison. Such transmitters are optional, but they enable the use less powerful transmit pulses to achieve same polarization effect provided by a linear polarization of a single coil. In another alternative embodiment, only one antenna coil per cell is used for transmission.

Also in the embodiment of FIG. 8, each antenna coil is coupled to a respective receiver 154, 156, 158, 160, etc., via the optional transmit/receive switch 148. Though it may be preferred to use a dedicated transmitter for each antenna cell, some embodiments may achieve a cost savings by, e.g., using a single transmitter to drive each of the desired antenna coils of every cell in a parallel or series circuit configuration. Similarly, the desired receiving coils can be configured in series or parallel to feed a single receiver. In yet another embodiment the signals to and from the antenna coils are multiplexed together to communicate one-at-a-time with a single transmitter and/or receiver.

Figure 10:
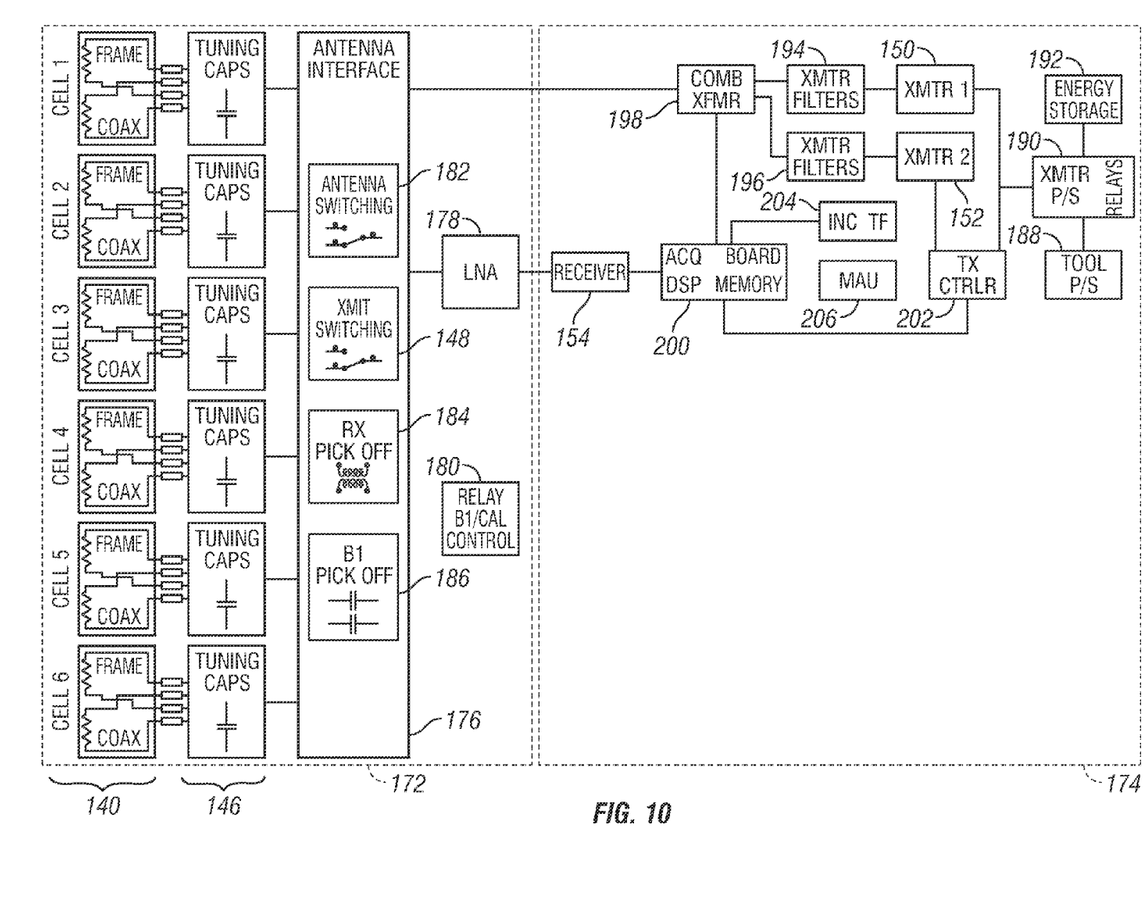
FIG. 10 is a function block diagram of an illustrative NMR logging tool.

FIG. 10 is a function block diagram of an illustrative NMR logging tool. The diagram is divided into two pieces: the sonde hardware 172 and the control board 174. The sonde hardware 172 includes an array of six antenna cells 140 each cell having at least an X-axis ("frame") coil and a Z-axis ("coax") coil. Each cell is coupled via a set of tuning capacitors 146 to the antenna interface 176. The antenna interface 176 includes a set of switches 182 for connecting selected coils of the antenna cells to the transmitter and receiver on the control board 174. It also includes a switch 148 for switching between transmit and receive mode. A "pick off" transformer 184 and a B1 "pick off" circuitry 186 are also included for coupling either the receive signal or the transmit signal, respectively, to the low noise amplifier (LNA) 178. The various switches 148, 182 and tuning capacitors 146 are controlled by an embedded controller 180.

The control board 174 includes power supply 188 for regulating and conditioning power to be delivered to the rest of the tool's electronic components. The source of the power may be downhole batteries, a fluid-driven generator, or electrical current provided from the surface via a wireline. To address their need for sudden bursts of power, the transmitters have a secondary power supply 190 that charges an energy storage unit 192. The energy storage unit 192 can be charged slowly to limit power demand, yet can release the sudden bursts of high current to drive the transmitters 150, 152. Filters 194, 196 operate on the outputs of the transmitters to shape the radio frequency pulses, thereby reducing harmonics and improving the signal-to-noise ratio of the measurements. A transformer 198 combines the outputs of the transmitters and provides the combined output to the antenna interface.

The control board 174 further includes a receiver 154 to demodulate the output of the LNA 178, and a processor board 200 that digitizes the signals from the receiver 154, transformer 198, and the position and temperature sensors 204. The processor board further includes a digital signal processor (DSP) and onboard memory. The onboard memory stores the digitized data and software that controls the operation of the tool. In response to the software, the DSP sets the operating parameters of a transmit controller 202 to adjust pulse amplitude, pulse width, pulse spacing, and the carrier frequency. The DSP monitors the transmit signal via the transformer 198 and optionally via the B1 pick off 186 and LNA 178, and adjusts the transmit signal parameters as needed to compensate for temperature drift and other imperfections in the performance of the circuitry. The DSP can further process the digitized measurements to determine distributions of relaxation times T1, T2, and/or T2*, and store the relaxation time information in memory. A memory access unit 206 enables the stored data to be retrieved from memory at the surface.

Figure 11:
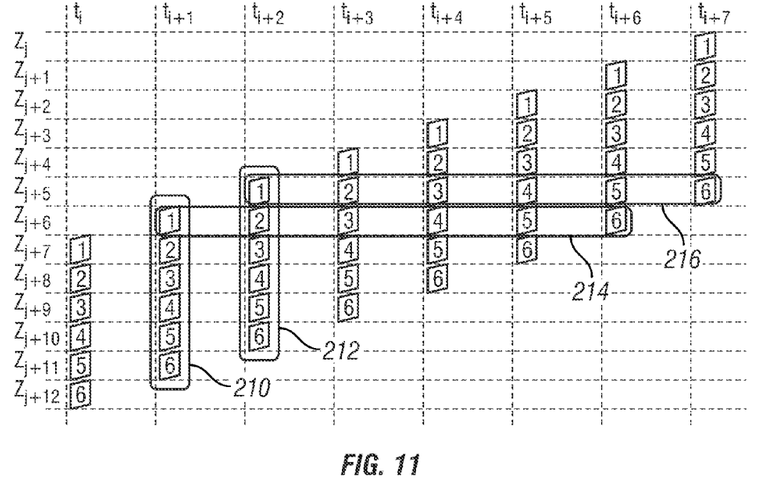
FIG. 11 shows a time-space relationship for antenna cell measurements.

FIG. 11 shows an illustrative time-space relationship for antenna cell measurements from a tool being drawn steadily uphole. At time the six antenna cell measurements correspond to the borehole positions $z_{j+7}$ through $z_{j+12}$, where i and j are arbitrary integers. At a subsequent time interval, $t_{i+1}$, the tool has moved so that the six antenna cell measurements now correspond to the borehole positions $z_{j+6}$ through $z_{j+11}$. The antenna cell positions are shown for time intervals $t_i$ through $t_{i+7}$.

To further improve the measurement signal-to-noise ratio, the processor can stack receive signal measurements, e.g., by summing digitized signal measurements before estimating relaxation times. If the six antenna cell measurements from a given time interval, e.g., $t_{i+1}$, are stacked as indicated by circle 210, a substantial increase in SNR is achieved at the cost of a loss of vertical resolution. Circle 212 indicates a similar stacking of the measurements at time $t_{i+2}$. Although it is possible to process these stacked measurements to extract the higher-resolution measurements, the SNR gain gets lost.

Circles 214 and 216 illustrate a second stacking alternative; the combination of all measurements at a given position in the borehole. For example, the measurement of antenna cell 1 at time $t_{i+1}$ can be stacked with the measurements of cell 2 at $t_{i+2}$, cell 3 at $t_{i+3}$, cell 4 at $t_{i+4}$, cell 5 at $t_{i+5}$, and cell 6 at $t_{i+6}$ to obtain a high SNR, high resolution measurement of the borehole at $z_{j+6}$.

Figure 12:
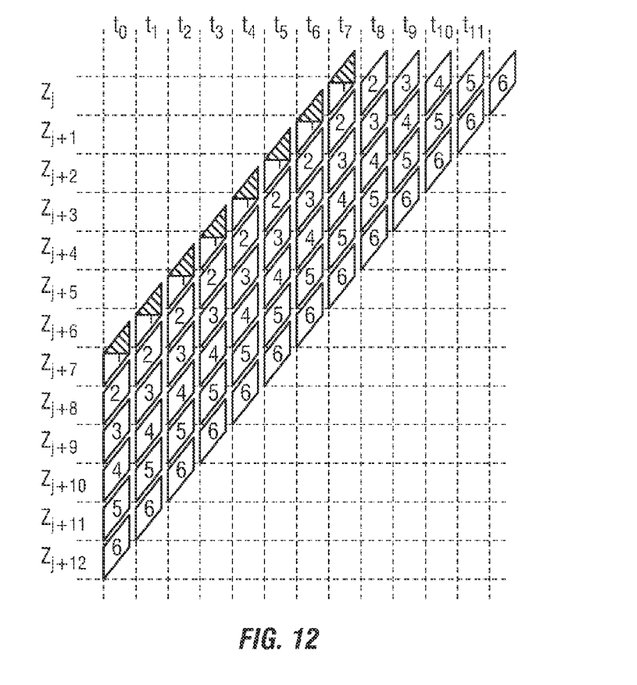
FIG. 12 shows a time-space relationship for a rapidly moving tool.

We note here that it may be desirable to exclude certain measurements from the stacking process. For example, FIG. 12 shows a time-space relationship of measurements made by a rapidly-moving tool. In the time it takes to complete a measurement sequence, the tool has moved far enough that antenna cell 1 is no longer operating on a properly-excited region of investigation. The shaded triangle represents the portion of each measurement process that is occurring outside the optimally-excited region of investigation. The corresponding measurements by antenna cell 2 are still valid since it has moved into the region initialized by cell 1, as are the measurements of the remaining cells. However, unless the tool corrects for this effect of tool motion, the measurements of antenna cell 1 are probably best discarded from the stacking process.

Figure 13:
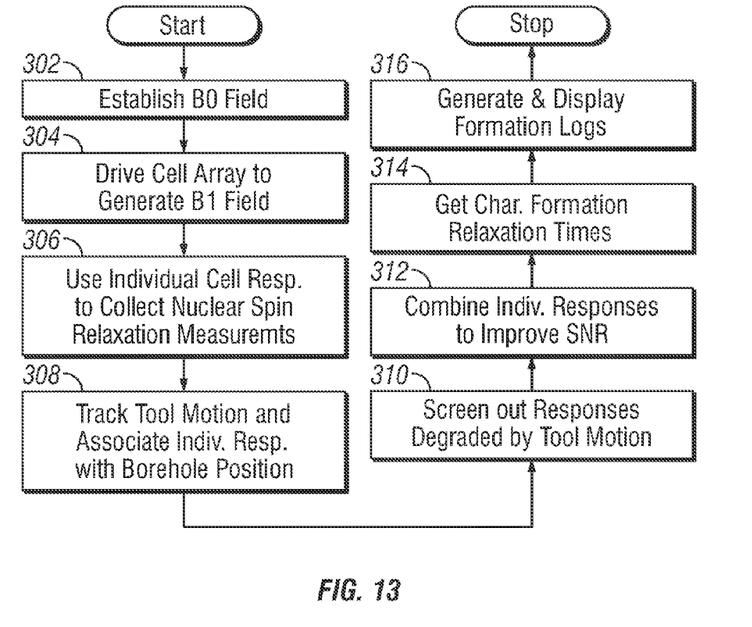
FIG. 13 is a flow diagram of an illustrative NMR logging method.

FIG. 13 shows an illustrative NMR logging method. In block 302, the tool establishes a static magnetic field B0 to orient the nuclei in the region of investigation. The static field can be produced shaped by an arrangement of permanent magnets and magnetically permeable materials. In block 304 the tool drives an array of antenna cells to generate a radio frequency field B1 to tip the orientations of the target nuclei into a plane transverse to the static field. In some embodiments, all of the antenna cells are driven together, but in various alternative embodiments, only selected antenna cells are driven at any one time.

Once the radio frequency field pulse ends, the tool begins collecting NMR signal measurements as the nuclei undergo spin relaxation. The tool preferably collects individual cell responses, either in parallel or just selected cell responses. The tool tracks the motion and orientation of the cell array so as to associate cell position and orientation with the measured cell response in block 308. In block 310, the tool compensates or excludes those measured responses that are degraded by tool motion, e.g., by motion which moves the antenna cell too far away from the properly-initialized region of investigation. The tool then combines selected individual responses (e.g., those corresponding to a given borehole position) to improve measurement SNR in block 312. In block 314, the tool processes the combined responses to determine the desired relaxation time information. The tool provides the logs of relaxation time information to a surface facility for further processing and/or display to a user.

Figure 14:
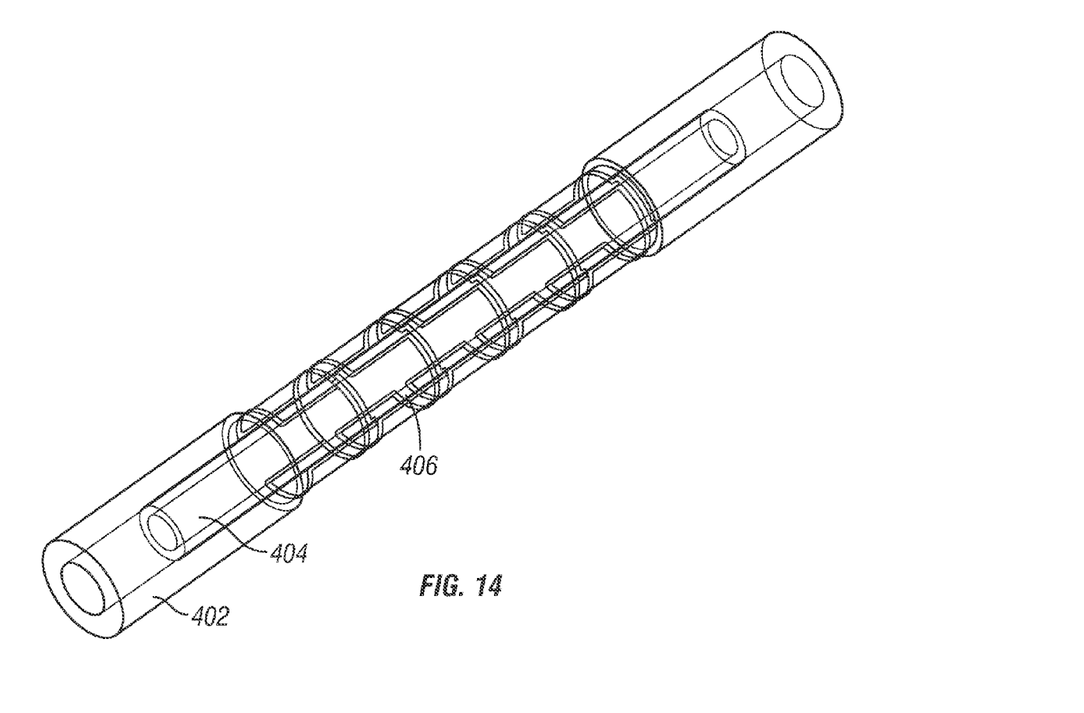
FIGS. 14-17 show illustrative magnet configurations for alternative tool embodiments.

Numerous variations and modifications will become apparent to those skilled in the art once the above disclosure is fully appreciated. It is intended that the following claims be interpreted to embrace all such variations and modifications. As just one example of apparent variation, the tool configuration shown in FIG. 4 is only one of many potential configurations that could be employed by an NMR logging tool. FIG. 14 shows an alternative logging tool embodiment in which a tool body 402 has an inner bore containing a radially magnetized tube magnet 404 and a recess in the outer surface where the antenna cell array 406 is mounted. The illustrated antennas are all transversely oriented (e.g., along an x-axis), but as discussed previously, each antenna cell can have additional antennas with different orientations.

Figure 15:
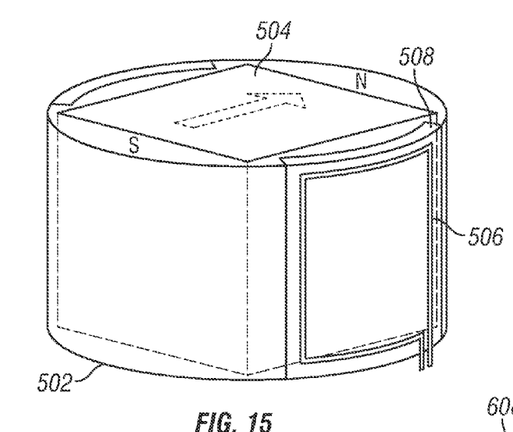

FIG. 15 shows an abbreviated tool segment 502 to illustrate a potential magnet configuration and relationship to primary antenna orientation of coils in the antenna cell array. Tool segment 502 includes a rectangular or "bread loaf" shaped magnet 504 having its magnetization perpendicular to the tool axis (e.g., if the tool axis is treated as the z-axis, the magnetization might be directed along the x-axis of the tool's coordinate system). Each antenna cell includes a coil antenna 506 oriented perpendicular to the tool axis and perpendicular to the magnet's polarization (e.g., along the y-axis). The antenna 506 can be backed by a mass of antenna core material 508 to improve the antenna efficiency. As with FIG. 14, there may be antenna loops on opposite sides of the tool to increase signal strength.

Figure 16:
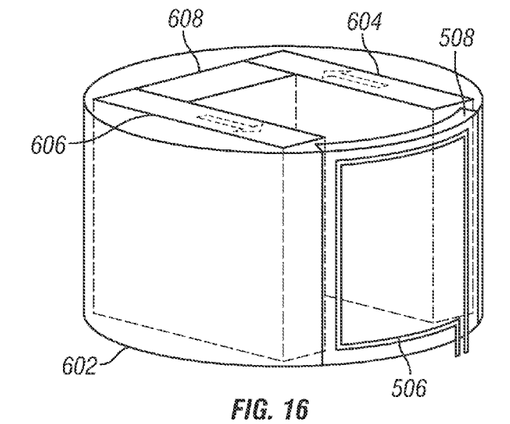

FIG. 16 shows abbreviated tool segment 602 having a U-shaped magnet configuration, with the arms of the "U" formed by two plate magnets 604, 606 and the base of the "U" formed by a block 608 having a high magnetic permeability. The magnets are magnetized in opposing directions perpendicular to the base of the U, and the block 608 connects the north pole of magnet 604 to the south pole of magnet 606. The "open" end of the U is directed perpendicular to the tool axis, e.g., along the y-axis, and the array of antenna cells is positioned in front of the open end. One antenna cell is shown in FIG. 16, having an antenna 506 oriented along the y-axis and backed by antenna core 508.

Figure 17:
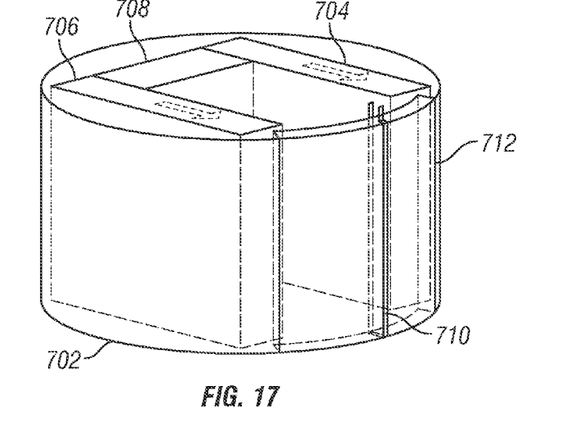

FIG. 17 shows abbreviated tool segment 702 having a different U-shaped magnet configuration. The magnets 704, 706 form the arms of the "U" and the base is formed by a block 708 having a high magnetic permeability. The magnets are again magnetized perpendicular to the base of the U, but unlike the opposing magnetization directions of FIG. 16, magnets 704, 706 have the same direction. Block 708 connects to the south poles of both magnets. The "open" end of the U is directed perpendicular to the tool axis (e.g., along the y-axis) and the array of antenna cells is positioned in front of the open end. FIG. 17 shows one antenna cell having an antenna 710 oriented along the x-axis and enclosing antenna core 712.

In each of the magnet configurations discussed herein, the magnetic poles can be reversed without adversely affecting tool performance. Some figures show antennas having only one orientation in each antenna cell, but antennas having additional orientations are contemplated in each case. Some of these antennas may be dedicated receivers, while others may be dedicated transmitters, and still others can function for both transmitting and receiving.

What is claimed is:

1. A nuclear magnetic resonance (NMR) logging method that comprises:
    establishing a static magnetic field (B0) with a tool positioned along a borehole through a formation;
    concurrently driving a plurality of antenna cells to produce a radio frequency field (B1) in said formation;
    measuring an individual response from each antenna cell as NMR relaxation occurs in the formation;
    combining individual responses, wherein said combining involves selectively excluding at least one of the measured individual responses due to tool motion; and
    determining at least one characteristic relaxation time of the formation based at least in part on the combined individual responses.

2. The method of claim 1, wherein said concurrently driving includes driving an antenna in each antenna cell with current having a substantially identical amplitude and phase.

3. The method of claim 1, wherein each antenna cell includes multiple coils configured to produce substantially orthogonal radio frequency fields.

4. The method of claim 3, wherein said concurrently driving includes concurrently producing said orthogonal radio frequency fields with a phase shift between the fields.

5. The method of claim 3, wherein different ones of said multiple coils are driven independently to produce only one of said orthogonal radio frequency fields at a time.

6. The method of claim 1, wherein said determining includes combining individual responses from multiple antenna cells to increase signal to noise ratio.

7. The method of claim 1, further comprising associating said individual responses with positions of the antenna cells when the individual responses were measured.

8. The method of claim 7, wherein said determining includes combining only individual responses associated with a given position.

9. The method of claim 8, further comprising excluding individual responses from antenna cells that due to tool motion are not measuring optimally polarized or saturated portions of the formation.

10. The method of claim 1, wherein said at least one antenna cell includes multiple coils from which orthogonal field measurements can be made.

11. The method of claim 10, wherein said determining includes combining individual responses from said multiple coils.

12. A nuclear magnetic resonance (NMR) logging tool that comprises:
    an arrangement of one or more magnets that generates a static magnetic field (B0) in a formation penetrated by a borehole containing said tool;
    plurality of antenna cells attached to the tool body, each cell having at least one coil antenna; and
    circuitry that drives the plurality of antenna cells in concert to produce a radio frequency field (B1) in said formation,
    wherein the circuitry further measures an individual response from each antenna cell as NMR relaxation occurs in the formation, and
    wherein the circuitry combines individual responses and selectively excludes at least one of the measured individual responses due to tool motion.

13. The tool of claim 12, wherein said circuitry drives the plurality of antenna cells in series or parallel to inject currents having a substantially identical amplitude and phase in each antenna.

14. The tool of claim 12, wherein said circuitry combines individual responses from multiple antenna cells to obtain a combined response having an increased signal-to-noise ratio.

15. The tool of claim 12, wherein each of the plurality of antenna cells includes a transmit coil that is also used to measure said individual responses.

16. The tool of claim 12, further comprising a motion sensing unit that tracks a position of the tool.

17. The tool of claim 12, wherein the circuitry associates said individual responses with borehole positions of the antenna cells from which the individual responses were measured.

18. The tool of claim 17, wherein the circuitry combines individual responses associated with a given borehole position.

19. The tool of claim 18, wherein the circuitry excludes those individual responses suffering from degradation due to tool motion.

20. The tool of claim 12, wherein the circuitry tracks tool motion based at least in part on signal degradation in the individual responses.

21. The tool of claim 12, wherein each of the antenna cells in the plurality of antenna cells includes multiple coils from which orthogonal field measurements can be made.

22. The tool of claim 21, wherein the circuitry combines individual responses from said multiple coils.

23. The tool of claim 21, wherein the circuitry drives said multiple coils in a phased relationship to produce the radio frequency field (B1).

24. The tool of claim 12, wherein the tool is a wireline tool or a tubing-conveyed logging tool.

25. The tool of claim 12, wherein the tool is a logging-while-drilling tool.

26. The tool of claim 12, wherein each of the plurality of antenna cells includes a coil antenna that is used to transmit but not to receive.

27. The tool of claim 12, wherein each of the plurality of antenna cells includes a coil antenna that is used to receive but not to transmit.

* * * * *